Aug. 28, 1928.

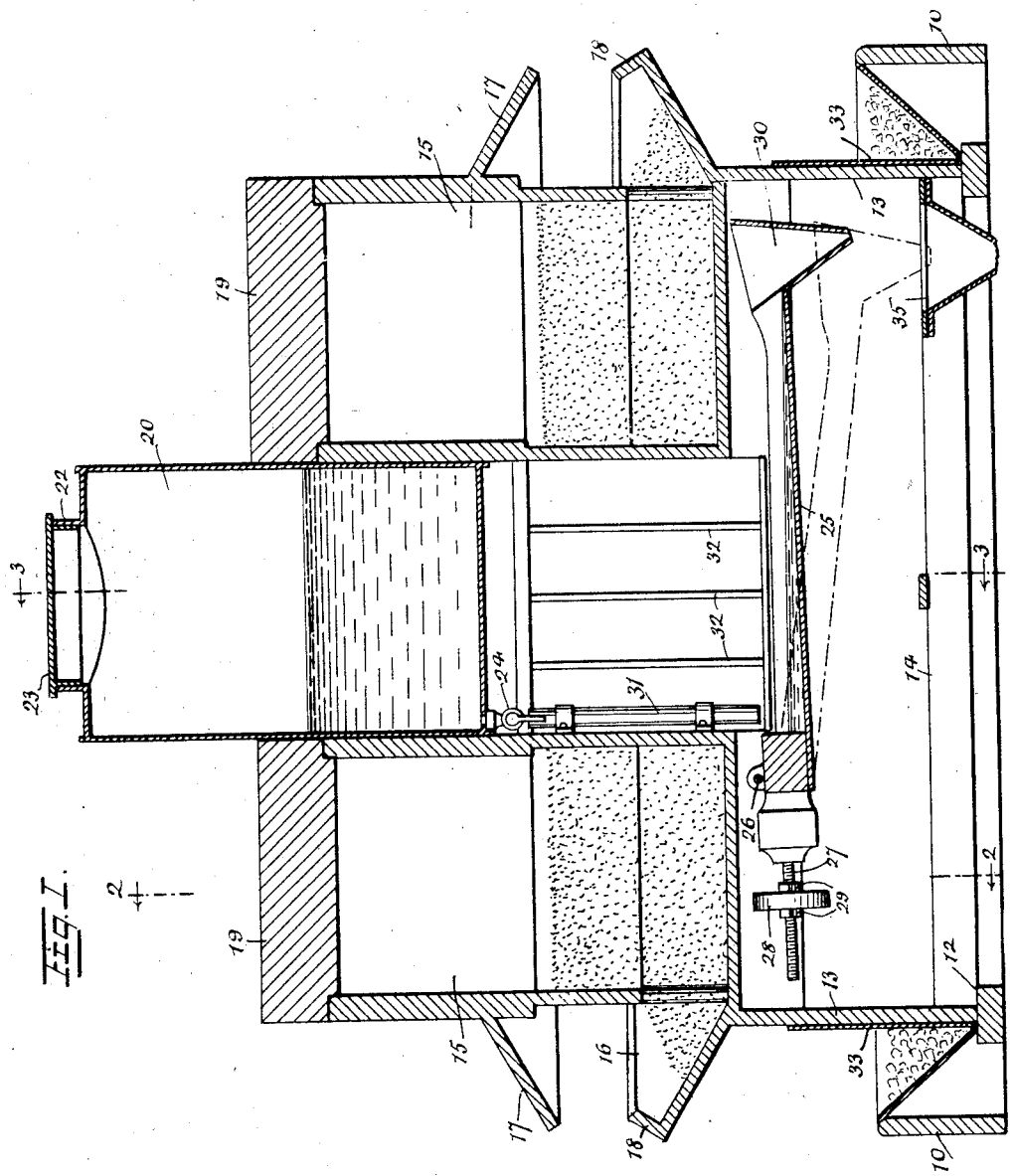

H. V. GUERTIN 1,682,614

POULTRY FEEDING AND WATERING DEVICE

Filed March 29, 1927 2 Sheets-Sheet 2

INVENTOR
*H. V. Guertin*
BY
*Munn & Co.*
ATTORNEY

WITNESSES
*H. J. Walker*
*Hugh H. Hert*

Patented Aug. 28, 1928.

1,682,614

UNITED STATES PATENT OFFICE.

HENRY V. GUERTIN, OF PATCHOGUE, NEW YORK.

POULTRY FEEDING AND WATERING DEVICE.

Application filed March 29, 1927. Serial No. 179,269.

This invention relates to an improved poultry feeding and watering device, and comprehends a sanitary and effectual means for feeding and watering poultry.

One of the principal objects of the present invention is to provide a protected ample supply of food and water for a poultry farm to eliminate the labor of repeated feedings during a given period of time.

The invention furthermore comprehends an improved apparatus for maintaining a fresh supply of water, which includes means for automatically emptying or completely discharging the water supply of a trough periodically to flush or cleanse the same of dirt, foreign matter, or other impurities which are occasioned by the water supply remaining in the trough for a long period of time.

As a still further object the invention contemplates the provision of a number of independent receptacles for holding dry mash, wet mash, oyster shells, grit, and other poultry requisites, certain of which receptacles are readily removable and replaceable to allow for cleansing.

Other objects and advantages reside in the simplicity of construction and mode of use of the device, the economy with which the same may be produced, and the general efficiency derived therefrom.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a vertical longitudinal sectional view through the feeding and watering device;

Fig. 2 is a transverse sectional view taken approximately on the line 2—2 of Fig. 1;

Fig. 3 is a similar sectional view taken approximately on the line 3—3 of Fig. 1.

Referring to the drawings by characters of reference, 10—10 and 11—11 designate vertically disposed end and side walls of a substantially rectangular base, the sides 11 of which are connected by cross strips 12 adjacent the lower edges and spaced inwardly from the end walls 10. A pair of vertical legs 13—13 extend upwardly from the cross strips 12, the said legs being of such a width as to dispose the side edges thereof in spaced relation to the side walls 11—11 of the base a distance approximately equal to the spacing of their outer surfaces from the end walls 10. The lower portions of the legs 13 are connected by longitudinal frame strips 14 attached to the outer wide edges and resting upon the cross strips 12. The legs 13 support a superstructure which includes a pair of longitudinally spaced bins 15—15, which are open at their lower ends and communicate with feeding troughs 16—16, the lower open ends of each bin being disposed below the upper open end of the troughs 16, whereby a predetermined quantity of feed is constantly maintained in the troughs. A canopy or hood 17 extends completely around the superstructure, overlying the troughs to protect the same against the drainage of water thereinto. It will be noted that the outer edge of the canopy or hood extends beyond the upper open edge of the trough 16 and that the side walls 18 of the troughs extend downwardly at an angle to receive and divert drain water beyond the outer surface of the side and end walls 11 and 10. The upper ends of the bins 15 are normally closed by removable gable-shaped covers 19, by means of which the feed is introduced to the bins. A water tank or reservoir 20 is positioned between the spaced bins 15 and is supported by cradle pieces 21 mounted on the intermediate portions of the hood 17. The tank is provided at its upper end with a filling neck 22 normally closed by a removable closure cap 23. The lower portion is provided with a discharge cock or faucet 24, which is disposed adjacent one end. A water trough 25 is fulcrumed upon a transverse pivot 26 carried by the superstructure and said water trough is of a substantially semi-circular cross-sectional configuration and of greater depth at its pivoted end than at the opposite free end. The pivoted end is closed and is formed with an axially projecting threaded stem 27 upon which a weight 28 is mounted for longitudinal adjustment to adjustably counterbalance the trough. Jam nuts 29 are threaded on the stem to engage the opposite side of the counterbalance weight 28 when the proper adjustment has been obtained. At the opposite free end the trough 25 is provided with a substantially funnel-shaped terminal serving as a discharge spout. Normally the counterbalance weight is adjusted to swing the free end of the trough upwardly to position whereby the lower wall of the trough is disposed at an angle inclining upwardly from the closed fulcrum end. The said closed fulcrum end is disposed at a point approximately directly beneath the faucet or cock 24 and a tube or pipe section 31, preferably of glass, extends from the faucet or cock 24 to a point slightly above the closed fulcrum end of the trough. The water from the supply tank 20 is allowed to slowly feed by adjusting the cock 24, into the water trough 25, and access to the trough by the poultry is gained from opposite sides through the spaces between vertical bars 32 which are arranged in the superstructure on opposite sides thereof. These bars serve to define separate points through which the poultry may reach the water trough so that a number of fowls may drink at the same time. The poultry will consume a proportion of the water, but periodically the water from the tank will sufficiently fill the trough 25 to overcome the counterbalance weight, thereby swinging the free end downwardly to discharge and flush the trough to carry off dirt, sediment and impurities from the water trough. Between the end walls 10 and the legs 13, removable troughs 33 are positioned for the reception of wet mash, oyster shells, grit, or the like, and between the side walls 11 and the side edges of the legs, removable troughs 34 are positioned for a similar purpose. If desired, the longitudinal frame strips 14 may support the upper end of a drain pipe 35 for receiving and conveying off the water discharged through the funnel-shaped channel 30 of the water trough so as to prevent dampening of the ground around the device. The water tank 20 is removably mounted in the superstructure so that the same may be detached and cleansed when necessary. In order to provide means for properly positioning the tank in the cradle pieces 21, so that the nozzle of the cock or faucet 24 will coincide with the tube or pipe 31, the tank is formed with a stop element 36 which engages with the canopy or hood 17.

From the foregoing it will thus be seen that a highly efficient and sanitary poultry feeding and watering device has been devised.

What is claimed is:

1. A poultry feeding device, including a base and a superstructure, removable trough elements carried by the base, longitudinally spaced feed bins on the superstructure having troughs communicating with and gravitationally fed by the bins, and a canopy carried by the superstructure and extending outwardly from the bins over the bin troughs, for conveying off and preventing drain water from entering the bin troughs, the said bin troughs having downwardly and outwardly inclined outer walls for conveying off drain water from the removable base trough elements.

2. A poultry watering device, including a pivoted water trough having a closed weighted end and a bottom wall normally inclined upwardly toward the opposite free end, a superposed water supply discharging into said trough, adapted when the trough is filled, to overbalance the weighted end for periodically discharging the water from the trough for flushing and cleansing sediment and other foreign matter from the trough, the free end having a funnel-shaped terminal for directing the discharge of the water therefrom to a predetermined point.

3. A poultry watering device, including a pivoted water trough having a closed weighted end and a bottom wall normally inclined upwardly toward the opposite free end, a superposed water supply discharging into said trough, adapted when the trough is filled, to overbalance the weighted end for periodically discharging the water from the trough for flushing and cleansing sediment and other foreign matter from the trough, the free end having a funnel-shaped terminal for directing the discharge of the water therefrom to a predetermined point, the weighted end having an adjustable weight for varying the discharge periods of the trough.

HENRY V. GUERTIN.